United States Patent [19]

Imai

[11] Patent Number: 4,701,901

[45] Date of Patent: Oct. 20, 1987

[54] DISC PLAYER

[75] Inventor: Nobuo Imai, Saitama, Japan

[73] Assignee: Sanyo Electric Co., Ltd., Moriguchi, Japan

[21] Appl. No.: 821,185

[22] Filed: Jan. 22, 1986

[30] Foreign Application Priority Data

Jan. 23, 1985 [JP] Japan .................................. 60-10290
Mar. 13, 1985 [JP] Japan ............................ 60-35536[U]

[51] Int. Cl.⁴ ........................ G11B 1/00; G11B 23/02; G11B 17/04; G11B 25/04
[52] U.S. Cl. .................... 369/75.2; 369/77.1; 369/221; 369/249; 369/270
[58] Field of Search .................... 369/75.2, 77.1, 77.2, 369/249, 219, 221, 270, 271

[56] References Cited

U.S. PATENT DOCUMENTS

| | | | |
|---|---|---|---|
| 3,954,272 | 5/1976 | Leedom | 369/249 |
| 4,479,210 | 10/1984 | Nakayama | 369/270 |
| 4,507,771 | 3/1985 | Tanaka | 369/77.2 |
| 4,592,040 | 5/1986 | Ohsaki | 369/77.1 |
| 4,627,037 | 12/1986 | Tamru et al. | 369/270 |

Primary Examiner—Steven L. Stephan
Attorney, Agent, or Firm—Armstrong, Nikaido, Marmelstein & Kubovcik

[57] ABSTRACT

An improved disc player which is arranged to successively effect the slide table sliding function, disc clamping function, and pick-up driving function only through employment of a single electric motor as a driving source for compact size and simple construction.

5 Claims, 7 Drawing Figures

DISC PLAYER

BACKGROUND OF THE INVENTION

The present invention generally relates to a disc player for reproducing signals recorded on a disc through employment of an optical pick-up and more particularly, to a disc player which is capable of mounting the disc onto the player and driving the optical pick-up by a single electric motor.

Conventionally, there has been proposed, for example, in Japanese Utility Model Publication (Jikkaisho) No. 59-36057, a disc player which is so arranged that a disc is mounted on a slide table slidable in a horizontal direction so as to reproduce signals recorded on said disc by an optical pick-up.

In the known disc player as referred to above, it is necessary to effect a slide table sliding function for sliding the slide table between a released position and a reproducing position, a disc clamping function for displacing the disc in a vertical direction when the slide table arrives at the reproducing position so as to clamp the disc on a turn table, and a pick-up driving function to displace the optical pick-up in the radial direction of the disc for the reproduction of the signals. Therefore, in the prior art disc player as referred to above, the slide table sliding function, disc clamping function, and pick-up driving function are carried out through employment of at least two electric motors, and since another electric motor is further required for rotating the turn table, at least three electric motors have been necessary as driving sources for one unit of the disc player, thus being very disadvantageous in the aspect of cost. Meanwhile, the three functions as described above must be successively and quickly effected, and employment of a plurality of motors for the driving sources requires the corresponding number of signals for change-over controls, and therefore, owing to the necessity for the timing adjustments, it has been inevitable to adopt complicated constructions on the whole.

SUMMARY OF THE INVENTION

Accordingly, an essential object of the present invention is to provide an improved disc player which is capable of successively effecting the slide table sliding function, disc clamping function and pick-up driving function only through employment of a single electric motor as a driving source.

Another important object of the present invention is to provide a disc player of the above described type including a clamping arrangement so arranged that, upon displacement of the slide table to a reproducing position, a guide pin is displaced in a radial direction of the disc by a depressing force of a cam portion provided on a rotary member, onto said guide pin so as to rotate a clamp plate for displacement from a non-clamping position to a clamping position.

In accomplishing these and other objects, according to one aspect of the present invention, there is provided a disc player arranged to reproduce, through employment of an optical pick-up, signals recorded on a disc to be mounted on a slide table adapted to slide in a horizontal direction, and comprising an electric motor serving as a driving source, a first transmission mechanism for transmitting rotation of the electric motor to the slide table, a second transmission mechanism for transmitting rotation of the electric motor to a driving mechanism of the optical pick-up, and a pivotal member for releasing connection between the electric motor and the second transmission mechanism at a first position, and also for connecting the electric motor and the second transmission mechanism at a second position. The pivotal member is arranged to be driven to the second position when the slide table is displaced to a reproducing position by the first transmission mechanism, with the disc being clamped on a turn table.

In another aspect of the present invention, the disc player is provided with a clamping arrangement for the disc, which comprises a rotary member adapted to rotate in association with the sliding function of the slide table and formed with a guide groove having cam portions with different diameters, and a clamp plate pivotable about an axis between a clamping position and a non-clamping position, and having a pressure contact portion for bringing the disc into pressure contact with the slide table and a guide pin inserted into the guide groove of said rotary member, whereby upon displacement of the slide table to the reproducing position, the clamp plate is displaced through rotation from the non-clamping position to the clamping position by a depressing force of the cam portion provided on the rotary member, onto the guide pin.

By the arrangement according to the present invention as described above, an improved disc player has been advantageously presented, with substantial elimination of disadvantages inherent in the conventional disc players of this kind.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
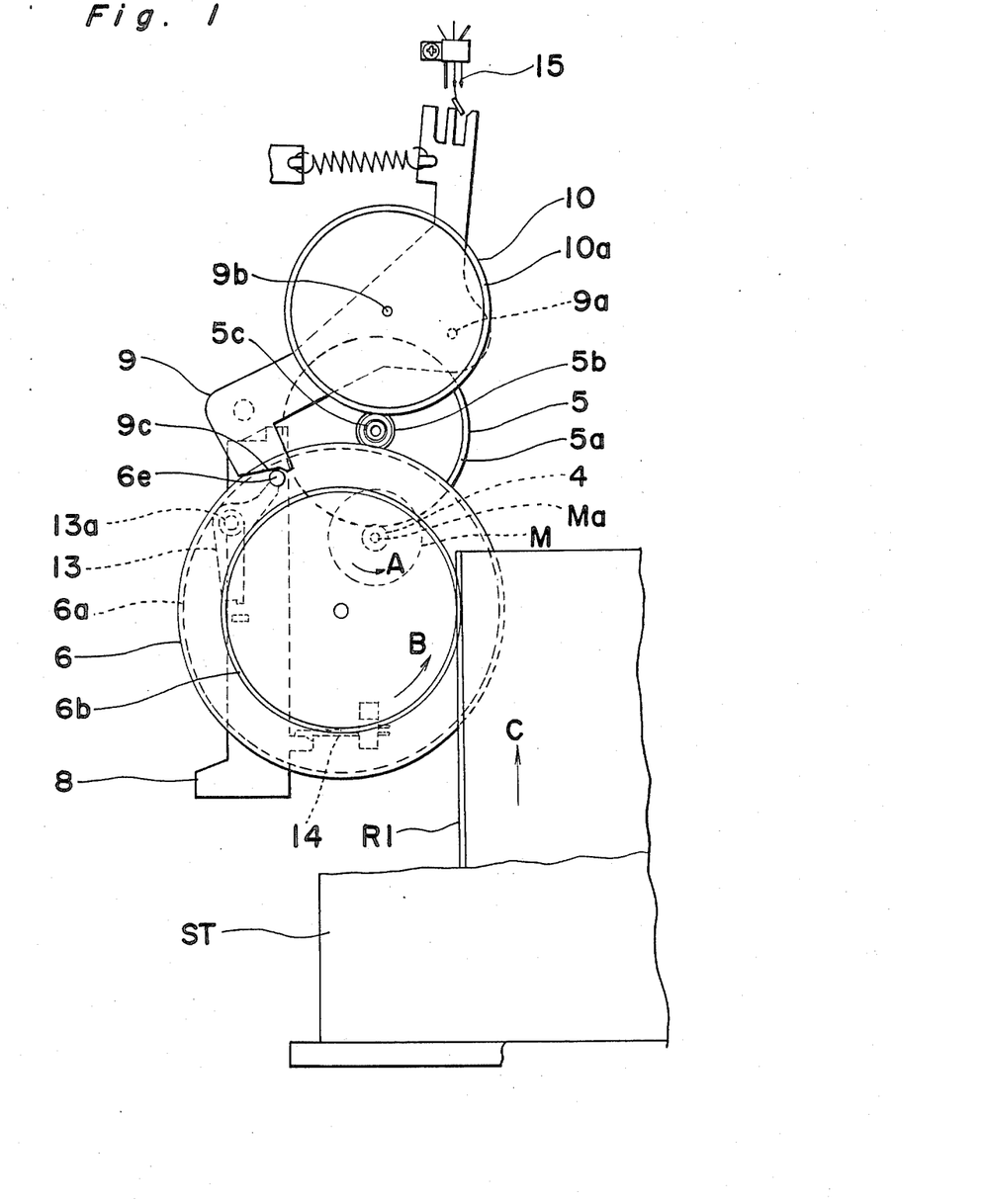
FIG. 1 is a schematic top plan view of a disc player according to one preferred embodiment of the present invention, showing the state wherein a slide table is at a released position.
Figure 2:
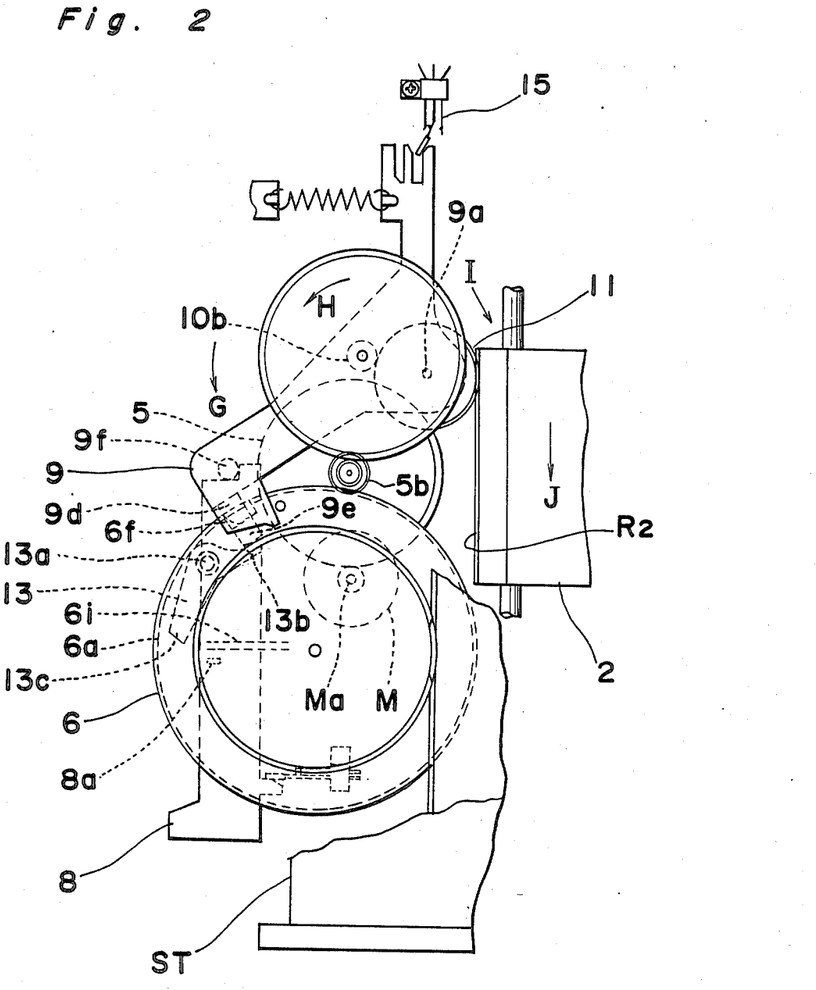
FIG. 2 is a view similar to FIG. 1, which particularly shows the state where the slide table is at a reproducing position.
Figure 3:
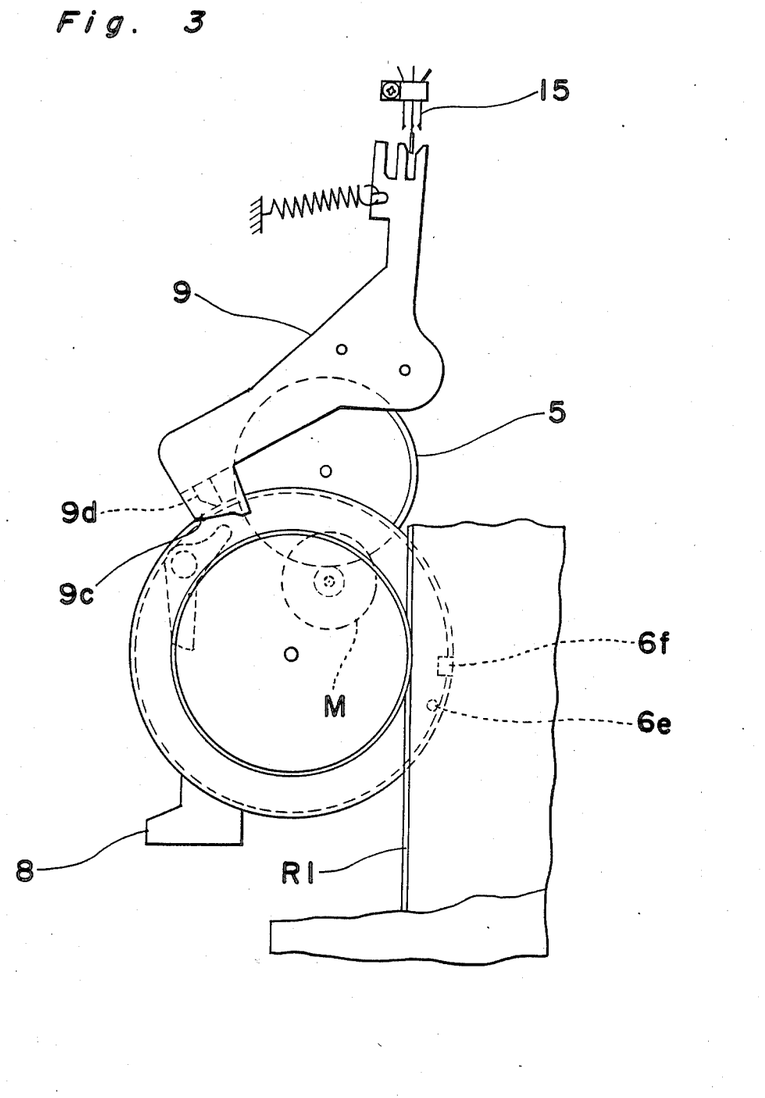
FIG. 3 is a view similar to FIG. 2, which particularly shows the state where the slide table is located between the released position and reproducing position.

Referring now to the drawings, there is shown in FIGS. 1 through 3, a disc player according to one preferred embodiment of the present invention, which generally includes a slide table ST, an optical pick-up 2, an electric motor M serving as a driving source, a first gear 4 fixed to a rotary shaft Ma of said motor M, a second gear 5 having first teeth 5a engaged with said first gear 4 and second and third teeth 5b and 5c, a third gear 6 having first teeth 6a in mesh with the second teeth 5b of said second gear 5, and second teeth 6b, a first rack R1 fixed to the slide table ST and engaged with the second teeth 6b of the third gear 6, an open/close lever 8 for open/close operation of the slide table ST, a pivotal lever 9 pivotable about a shaft 9a so as to take a first, second or third position according to the rotating position of said third gear 6, a fourth gear 10 rotatable about a rotary shaft 9b on said pivotal lever 9 and having first teeth 10a engaged with the third teeth 5c of said second gear 5 and second teeth 10b, a fifth gear 11 engaged with the second teeth 10b of said fourth gear 10, a second rack R2 fixed to the optical pick-up 2, and engaged with said fifth gear 11, a lever stop member 13 rotatable about a shaft 13a according to the position of said rotary lever 9, a first switch 14 to be controlled by the operation of said open/close lever 8, and a second switch 15 to be controlled according to the positions of said pivotal lever 9.

Figure 4:
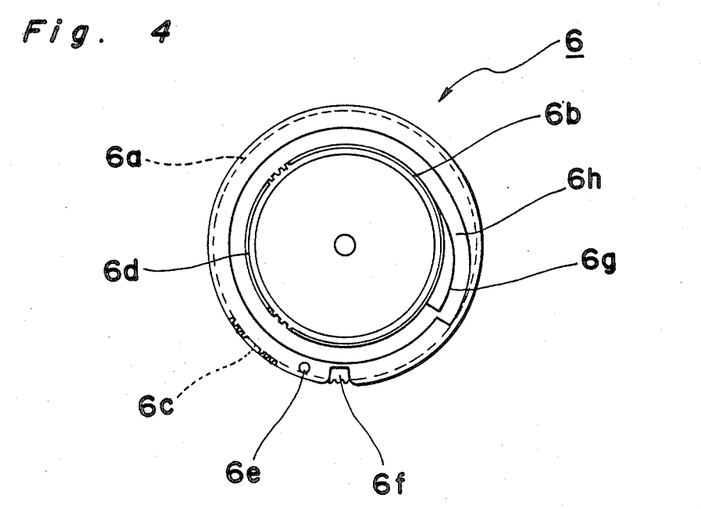
FIG. 4 is a top plan view showing a third gear employed in the disc player of FIGS. 1 through 3.

As shown in FIG. 1, the third gear 6 has the first teeth 6a engaged with the second teeth 5b of the second gear 5 at the outermost periphery thereof, with one part 6c of the first teeth 6a, FIG. 4, being cut out. Moreover, the third gear 6 has the second teeth 6b engaged with the first rack R1, FIG. 1, with one part 6d of said second teeth 6b, FIG. 4, being also cut out. Furthermore, said third gear 6 is provided with a pin 6e and a groove 6f, and when the end portion 9c of the pivotal lever 9 is engaged with the pin 6e (FIG. 1), the pivotal lever 9 is in the third position, while in the case where a projection 9d of said end portion 9c is fitted in the groove 6f (FIG. 2), the pivotal lever 9 is located at the second position. Additionally, the third gear 6 has a cam portion 6g, by which the lowering of the disc clamp plate CA (FIG. 5) may be effected.

Meanwhile, when the pivotal lever 9 is located at the second position in FIG. 2, the projection 9e of the pivotal lever 9 contacts one end 13b of the lever stop member 13, and thus, the lever stop member 13 is pivoted to the position shown in FIG. 2. In the above state, since the other end 13c of the lever stop member 13 does not confront the projection 8a of the open/close lever 8, when the open/close lever 8 is pushed in, said lever 8 is not obstructed in its displacement and may be pushed sufficiently deep into the inner portion. Meanwhile, when the lever stop member 13 is located at the third position as shown in FIG. 1 (the lever stop member 13 is set to be normally at the position shown in FIG. 1 by a coil spring not shown), the projection 8a of the open/close lever 8 confronts the end portion 13c of the lever stop member 13, and thus, the open/close lever 8 is allowed to be pushed in to a certain extent (only sufficient to subject the switch 14 to the on/off control), but is prevented from being pushed in any further.

On the assumption that the slide table ST is located at the release position as shown in FIG. 1, the pin 6e of the third gear 6 engages the end portion 9c of the pivotal lever 9, with said pivotal lever 9 being located at the third position, and the third teeth 5c of the second gear 5 are released from the engagement with the first teeth 10a of the fourth gear 10. In the above state, upon depression of the open/close lever 8, with the disc placed on a disc placing portion (not particularly shown) of the slide table ST, the first switch 14 takes the on state, but since the projection 8a of the open/close lever 8 contacts the end portion 13c of the lever stop member 13, the open/close lever 8 is prevented from being further pushed in. By the above operation, since the first switch 14 is actuated, with the power supply for the motor M turned on, said motor M starts rotation in the direction indicated by the arrow A (FIG. 1). The rotation of the motor M in the direction of the arrow A is transmitted to the third gear 6 through the first and second gears 4 and 5, thus causing said third gear 6 to rotate in the direction of the arrow B. By the rotation of the third gear 6 in the direction of the arrow B, the first rack R1 and the slide table ST to which the first rack R1 is fixed, are slid in the direction of the arrow C, and thus, displacement of the slide table ST towards the reproducing position is started.

When the third gear 6 is rotated to a certain extent in the direction of the arrow B from the state as shown in FIG. 1, the pin 6e of the third gear 6 is released from the engagement with the end portion 9c of the pivotal lever 9, and the pivotal lever 9 is brought to the first position in FIG. 3 so as to be retained in said first position until a projection 9d at the end portion 9c of the pivotal lever 9 is fitted into the groove 6f of the third gear 6 as the third gear 6 continues to rotate.

When the slide table ST has arrived at the reproducing position through rotation of the third gear 6 by the predetermined angle, since the third gear 6 has the cut-out portion 6d, the engagement between the second teeth 6b of the third gear 6 and the first rack R1 is released. Accordingly, upon releasing of the engagement of the third gear 6 with the first rack R1, sliding of the slide table ST is suspended so as to terminate the sliding function of said slide table, and the subsequent disc clamping function is started.

Figure 5:
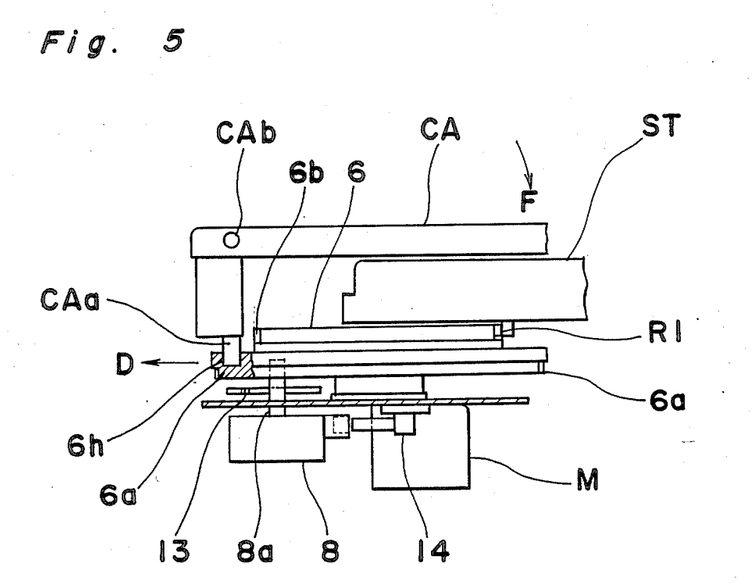
FIG. 5 is a fragmentary side elevational view partly in section and broken away, of the disc player in the state of FIG. 3.

As shown in FIG. 5, the disc clamp plate CA has a projection CAa which is fitted into a groove 6h of the third gear 6 (FIG. 4). Since the third gear 6 has the cam portion 6g as shown in FIG. 4, when the third gear 6 is further rotated by the motor M after the engagement between the third gear 6 and the first rack R1 has been released, the projection CAa of the disc clamp plate CA is depressed by the cam portion 6g in the direction of the arrow D, and based on the principle of a lever, the forward end of said disc clamp plate CA is rotated about the shaft CAb in the direction of the arrow F to effect the clamping of the disc.

Upon further rotation of the third gear 6, the projection 9d at the end portion 9c of the pivotal lever 9 is fitted into the groove 6f of the third gear 6, and as shown in FIG. 2, the pivotal lever 9 is largely displaced to the second position, so as to change-over the second switch 15 as shown, and thus, the termination of the slide table sliding function and the disc clamp function is notified to the control circuit (not shown) so as to stop rotation of the motor M. Simultaneously, since the cut-out portion 6c of the first teeth 6a of the third gear 6 confronts the second teeth 5b of the second gear 5, the third gear 6 stops rotation. When the pivotal lever 9 is rotated about the shaft 9a in the direction of the arrow G to be displaced to the position of FIG. 2, the fourth gear 10 is also displaced in the direction of the arrow G (FIG. 2), and the third teeth 5c of the second gear 5 are engaged with the first teeth 10a of the fourth gear 10. Therefore, in the absence of the optical pick-up 2 in the innermost peripheral position of the disc, the motor M is energized for rotation, which rotation is transmitted to the forth gear 10 through the first gear 4 and the second gear 5 to rotate said fourth gear 10 in the direction of the arrow H (FIG. 2). Accordingly, the fifth gear 11 engaged with the second teeth 10b of the fourth gear 10 rotates in the direction of the arrow I to cause the second rack R2 and the optical pick-up 2 to slide in the direction of the arrow J. When the pick-up 2 arrives at the start position at the innermost periphery of the disc, the motor M stops rotation, and the disc player is brought into the stand-by state.

In the above stand-by state, designation of music numbers, etc. is effected, and upon starting of the reproduction, the motor M is again energized, and the pick-up 2 is driven in the direction opposite to that of the arrow J by the motor M for the reproduction of the signals.

For ejecting the disc, with the disc player being stopped in the reproducing state, the open/close lever 8 may be depressed. More specifically, in the reproducing state as shown in FIG. 2, the pivotal lever 9 is at the second position, and by the projection 9e of the pivotal lever 9 located at this second position, the lever stop member 13 has been rotated to the position shown in FIG. 2, with the end portion 13c of the lever stop member 13 not confronting the projection 8a of the open/close lever 8, and thus, it is made possible to fully push in the open/close lever 8. Therefore, upon depression of the open/close lever 8 in FIG. 2, the forward end of the open/close lever 8 urges the pivotal lever 9 in the direction opposite to that of the arrow G at a projection 9f, and thus, the pivotal lever 9 is released from the engagement with the groove 6f of the third gear 6. Simultaneously, since the projection 8a of the open/close lever 8 depresses a corresponding projection 6i of the third gear 6, the third gear 6 is rotated to a certain extent, with the first teeth 6a of said third gear 6 being engaged with the second teeth 5b of the second gear 5, whereby the rotation of the motor M in the direction opposite to the arrow A is transmitted to the third gear 6 through the first and second gears 4 and 5 to rotate said third gear 6 in the direction opposite to the arrow B, and thus, the disc clamp plate CA is pivoted in the direction opposite to the arrow F, with sliding movements of the first rack R1 and the slide table ST in the direction opposite to the arrow C. It is to be noted here that, since the second gear 5 is disengaged from the fourth gear 10 at the time point when the pivotal lever 9 is urged by the open/close lever 8, the optical pick-up 2 is not displaced even when the motor M is rotated.

By the depression of the open/close lever 8, the disc player is returned to the released state in FIG. 1 from the reproducing state in FIG. 2 through the state in FIG. 3. Accordingly, if the open/close lever 8 is again depressed, with the disc replaced, the reproduction may be again effected through the function as described so far, while when the open/close lever 8 is depressed, with the disc removed, the slide table ST is displaced into the reproducing position, and the functioning is stopped.

As is seen from the foregoing description, according to the present invention, an improved disc player which is capable of effecting the sliding function of the slide table, clamping function for the disc, and driving function for the optical pick-up by a single motor as a driving source, can be presented. Moreover, by providing a plurality of functions to the third gear as in the foregoing embodiment, the constructions may be simplified to a large extent.

Figure 6:
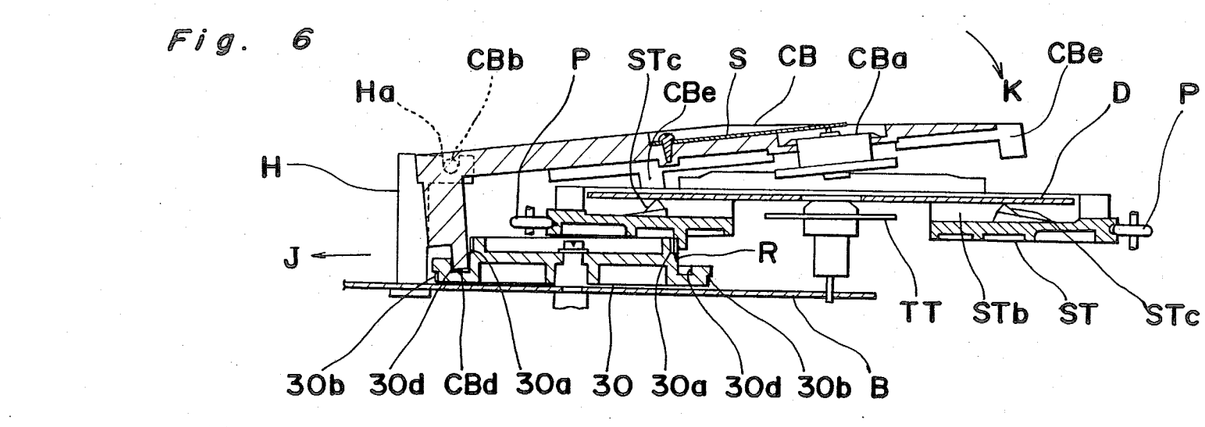
FIG. 6 is a side sectional view of a clamping arrangement for a disc player according to a second embodiment of the present invention, showing the state wherein a clamp plate is at a non-clamping position.
Figure 7:
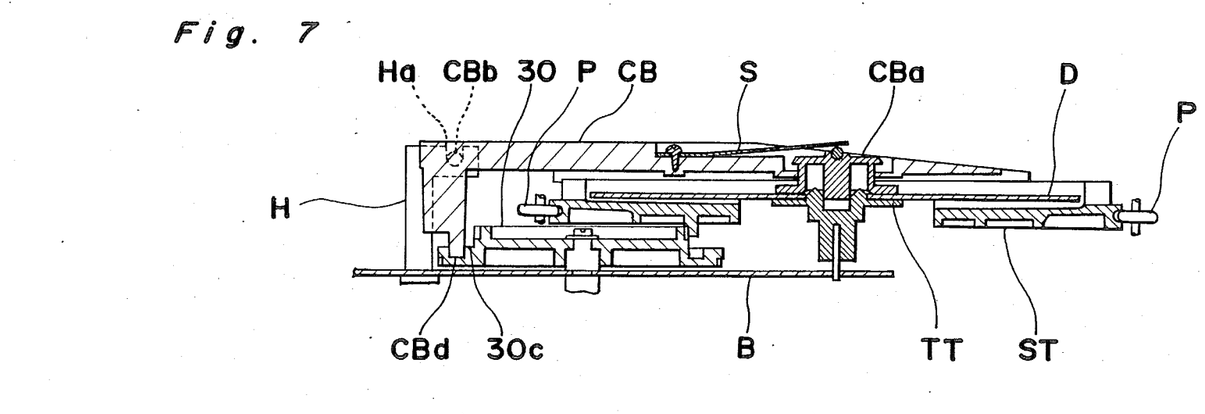
FIG. 7 is a view similar to FIG. 6, which particularly shows the state wherein the clamping plate is at a clamping position.

Referring to FIGS. 6 and 7, there is shown a disc player according to another embodiment of the present invention, in which a clamp plate CB is adapted to be turned upwards or downwards for opening or closing. In FIG. 6, the clamp plate CB is shown in the state where it is located at the non-clamping or opened position, while in FIG. 7, said clamp plate is illustrated as positioned at the clamping or closed position.

In FIGS. 6 and 7, the disc player includes a slide table ST movably supported by a plurality of rollers P, a first gear 30 having first teeth 30a engaged with a rack R formed on the reverse face of the slide table ST, a turn table TT for rotating a disc D, and the clamp plate CB having a pressure contact portion CBa for depressing said disc D onto said turn table TT. The first gear 30 referred to above is formed, at its outer peripheral portion, with second teeth 30b engaged with a second gear (not particularly shown) fixed to the rotary shaft of a motor (not shown) as a driving source, while a guide groove 30d having cam portions 30c with different diameters is formed between the first teeth 30a and the second teeth 30b. Meanwhile, the clamp plate CB has a pair of projections CBb respectively extending outwardly from opposite sides thereof, and a guide pin CBd extending downwardly from an intermediate portion of a line connecting said projections CBb. The projections CBb are respectively fitted into corresponding recesses Ha formed in a pair of spaced boss portions H erected on a chassis B, so that the clamp plate CB may be pivoted about an axis formed by a line connecting said projections CBb, with the guide pin CBd being inserted into the guide groove 30d of said first gear 30.

Now, on the assumption that the slide table ST is located at the disc mounting/dismounting position, upon depression of the open/close lever (not shown here), with the disc D placed on the disc placing portion STb, the motor (not shown here) starts rotation in the clockwise direction, which rotation is transmitted to the second teeth 30b of the first gear 30 through the second gear (not shown) so as to rotate said first gear 30 counterclockwise. Since the counterclockwise rotation of said first gear 30 is transmitted to the rack R formed in the slide table ST, the slide table ST is caused to slide for displacement towards the reproducing position. In this case, the guide pin CBd of the clamp plate CB is located in the position other than the cam portion 30c of the guide groove 30d of the first gear 30, and therefore, the clamp plate CB is in the non-clamping position at which the pressure contact portion CBa thereof is raised or spaced from the turn table TT as shown in FIG. 6. Thereafter, when the first gear 30 is rotated through a predetermined angle, and the slide table ST has reached the reproducing position, the engagement between the first teeth 30d and the rack R is released by a cut-out portion (not shown) formed in the first teeth 30a of the first gear 30, and thus, the sliding function of the slide table ST is stopped.

Subsequently, when the first gear 30 is further rotated by the motor (not shown), the guide pin CBd of the clamp plate CB reaches the cam portion 30c of the guide groove 30d, and the guide pin CBd is depressed by the cam portion 30c in the direction of the arrow J. Accordingly, the clamp plate CB is pivoted about the axis in the direction of the arrow K based on the principle of a lever. Upon rotation of the clamp plate CB in the direction of the arrow K, spaced projections CBe (FIG. 6) extending downwardly from one side edge of the clamp plate CB depress associating members (not shown) provided on the slide table ST so as to be associated with support portion STc on the disc placing portion STb for supporting the disc D, and cause the disc D to be lowered onto the turn table TT, while the pressure contact portion CBa of the clamp plate CB depresses the disc D. Accordingly, as shown in FIG. 7, the clamp plate CB is displaced to the clamping position at which the disc D is fixedly pressed against the turn table TT by the pressure contact portion CBa, and thus, the disc clamping function is completed. It should be noted here that, since the pressure contact portion CBa is supported at one end of a plate spring S fixed at its other end to said clamp plate CB, even a warped disc may be positively pressed against the turn table TT for fixing without any damage.

As is clear from the foregoing description, according to the above embodiment of the present invention, owing to the arrangement that, when the slide table is displaced to the reproducing position, the guide pin is moved in the diametrical direction of the disc by the depressing force of the cam portion provided on the rotary member to be rotated in association with the slide table, an improved clamping device for a disc player in which the slide table sliding function and the disc clamping function may be effected through a series of functioning, has been advantageously presented through simple construction.

In the operation of the device, with slide table (ST) at the open position, disc (D) is placed on the slide table and open/close lever (8) is depressed. Motor (3) is rotated in the direction of the arrow A, FIG. 1, and third gear (6) (numeral 30 in FIGS. 6 and 7) is rotated in the direction of the arrow B. Thus, displacement of slide table (ST) toward the reproducing position is started. Simultaneously, pivotal lever (9) is displaced to the first position, as shown in FIG. 3, which it maintains until slide table (ST) is displaced to the reproducing position. During displacement of slide table (ST), the driving force of motor (M) is not transmitted to the fourth gear (10), and the optical pick-up (2) is not driven.

When the slide table (ST) is displaced to the reproducing position, third gear (6) has been rotated through a predetermined angle. At such angle, because of the cut out portion (6d) in third gear 6, the driving force of motor (M) is not to be transmitted to the slide table (ST). The sliding movement of slide table (ST) is thus stopped. Meanwhile, third gear (6) still rotating, and the projection (CAa) (CBb, FIG. 6) of the clamp plate (CA) (CB, FIG. 6) mates with guide groove (6h) (30d, FIG. 6) having cam portions (6g) (30c, FIG. 6) of different diameters formed on third gear (6), the projection (CAa) reaches the cam portions (6g). By rotation of third gear (6) thereafter, clamp plate (CA) is rotated as a lever and displaced to the clamping position for fixing disc (D) on the turntable (TT) under pressure. Disc clamping is then complete.

Upon further rotation of third gear (6), until the disc clamping function is completed, pivotal lever (9) is displaced to the second position, as shown in FIG. 2 by engagement of projection (9d) of pivotal lever (9) with groove (6f), FIG. 4, of the third gear (6). Because cut-out portion (6c), FIG. 4, of the first teeth (6a) of the third gear (6) confront second teeth (5b) of second gear (5), the driving force of motor (M) is not transmitted to third gear (6). When pivotal lever (9) is displaced to the second position, rotation of the motor (M) is stopped and, because of the displacement of fourth gear (10), the driving force of motor M is transmitted to the optical pick-up (2). Accordingly, thereafter, the driving force of motor (M) is transmitted only to the optical pick-up (2) for disc (D) reproduction.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a disc player arranged to produce, through employment of an optical pick-up, signals recorded on a disc mounted on a turn table mounted for rotation on a slide table adapted to slide in a horizontal direction, said disc player comprising an electric motor serving as a driving source, a first transmission connected to said electric motor for sliding said slide table, a second transmission mechanism connected to said electric motor for driving said optical pick-up, and a pivotal member connecting said electric motor and said first transmission mechanism at a first position and for connecting said electric motor and said second transmission mechanism at a second position, said pivotal member being driven from said first position to said second position when said slide table is displaced to a reproducing position by said first transmission mechanism, with said disc clamped on said turn table, said motor being released from said connection with said second transmission mechanism when said pivotal member has been displaced to said first position, and being released from said connection with said first transmission mechanism when said pivotal member is displaced to said second position.

2. A disc player as claimed in claim 1, wherein said pivotal member is urged by a spring means to be rotated to said second position and is supported at said first position by a support portion, said pivotal member being released from said support portion at said first position for rotation from said first position to said second position when said slide table is displaced to said reproducing position by said first transmission mechanism with said disc clamped on said turn table.

3. A disc player as claimed in claim 1, wherein said first transmission mechanism includes a first gear fixed to a rotary shaft of said motor for transmitting rotation of said motor, through second and third gears, to said slide table, said third gear being rotated during the sliding function of said slide table and having a guide groove with a cam portions, said disc player further including a disc clamp plate pivotable about an axis between a clamping position and a non-clamping position and having a projection fitted in said guide groove of said third gear, whereby upon displacement of said slide table to said reproducing position, said disc clamp plate is displaced through pivotal movement from said non-clamping position to said clamping position by a depressing force of said cam portions of said guide groove of said third gear, on said projection of said clamp plate.

4. A disc player as claimed in claim 1, further comprising a clamping arrangement which includes a gear fixed to a rotary shaft of said motor for moving said first transmission mechanism, said gear being rotated during the sliding of said slide table and being formed with a guide groove having cam portions with different diameters, and a clamp plate pivotable about an axis between a clamping position and a non-clamping for bringing said disc into pressure content engagement position, and having a pressure contact engagement for bringing said disc into pressure content engagement with the slide table and a guide pin fitted into said guide groove of said gear, whereby upon displacement of said slide table to said reproducing position, said clamp plate is displaced through pivotal movement from said non-clamping position to said clamping position by a depressing force on said guide pin by said cam portion on said gear.

5. In a disc player provided with a slide table for sliding in a horizontal direction between a disc mounting/disc position and a reproducing position, a clamping means for said disc player comprising a rotary member for rotation during sliding of said slide table and having a guide groove with cam portions having different diameters and a clamp plate pivotable about an axis between a clamping position and a non-clamping position and having a pressure contact portion for engaging said disc in pressure contact with said slide table and a guide pin fitted into said guide groove of said rotary member, whereby upon displacement of said slide table to said reproducing position, said clamp plate is displaced through pivotal movement from said non-clamping position to said clamping position by a depressing force on said guide pin by said cam portion on said rotary member.

* * * * *